US009730038B2

(12) United States Patent
Clark et al.

(10) Patent No.: US 9,730,038 B2
(45) Date of Patent: Aug. 8, 2017

(54) TECHNIQUES TO MANAGE PLATFORM MIGRATIONS

(71) Applicant: Facebook, Inc., Menlo Park, CA (US)

(72) Inventors: Jason Clark, Wookinville, WA (US); Benjamin Golub, San Francisco, CA (US); Jan Marek Jezabek, Sunnyvale, CA (US)

(73) Assignee: FACEBOOK, INC., Menlo Park, CA (US)

( * ) Notice: Subject to any disclaimer, the term of this patent is extended or adjusted under 35 U.S.C. 154(b) by 336 days.

(21) Appl. No.: 13/781,191

(22) Filed: Feb. 28, 2013

(65) Prior Publication Data

US 2014/0244719 A1 Aug. 28, 2014

(51) Int. Cl.

| | |
|---|---|
| ***G06F 15/16*** | (2006.01) |
| ***H04W 4/20*** | (2009.01) |
| ***H04L 29/06*** | (2006.01) |
| ***G06F 9/44*** | (2006.01) |
| ***H04W 4/00*** | (2009.01) |

(52) U.S. Cl.

CPC .............. *H04W 4/206* (2013.01); *G06F 9/44* (2013.01); *H04L 29/0604* (2013.01); *H04W 4/003* (2013.01)

(58) Field of Classification Search

CPC ............................... G06F 9/44; H04L 29/0604
USPC ........................................................... 709/203
See application file for complete search history.

(56) References Cited

U.S. PATENT DOCUMENTS

2005/0210459 A1* 9/2005 Henderson ................ G06F 8/65 717/168
2011/0047536 A1* 2/2011 Santos ...................... G06F 8/71 717/170
2011/0231865 A1* 9/2011 Dorn et al. ................... 719/328
2013/0246849 A1* 9/2013 Plamondon ......... G06F 11/3688 714/27

* cited by examiner

*Primary Examiner* — Kevin Mai

(57) ABSTRACT

Techniques to manage platform migrations are described. In one embodiment, for example, an apparatus may comprise an interface component, a bundle component, and an execution component. The interface component may be operative to receive a command from a client, the command comprising a bundle identifier for the client. The bundle component may be operative to determine a bundle of platform migrations associated with the client based on the bundle identifier. The execution component may be operative to execute the command on behalf of the client based on the bundle of platform migrations. Other embodiments are described and claimed.

16 Claims, 12 Drawing Sheets

1000

Receive a command from a client, the command comprising a bundle identifier for the client and a routine from an application programming interface (API).
*1002*

Determine a bundle of platform migrations associated with the client based on the bundle identifier, at least one platform migration of the bundle of platform migrations specifying a version of the routine.
*1004*

Execute the specified version of the routine on behalf of the client.
*1006*

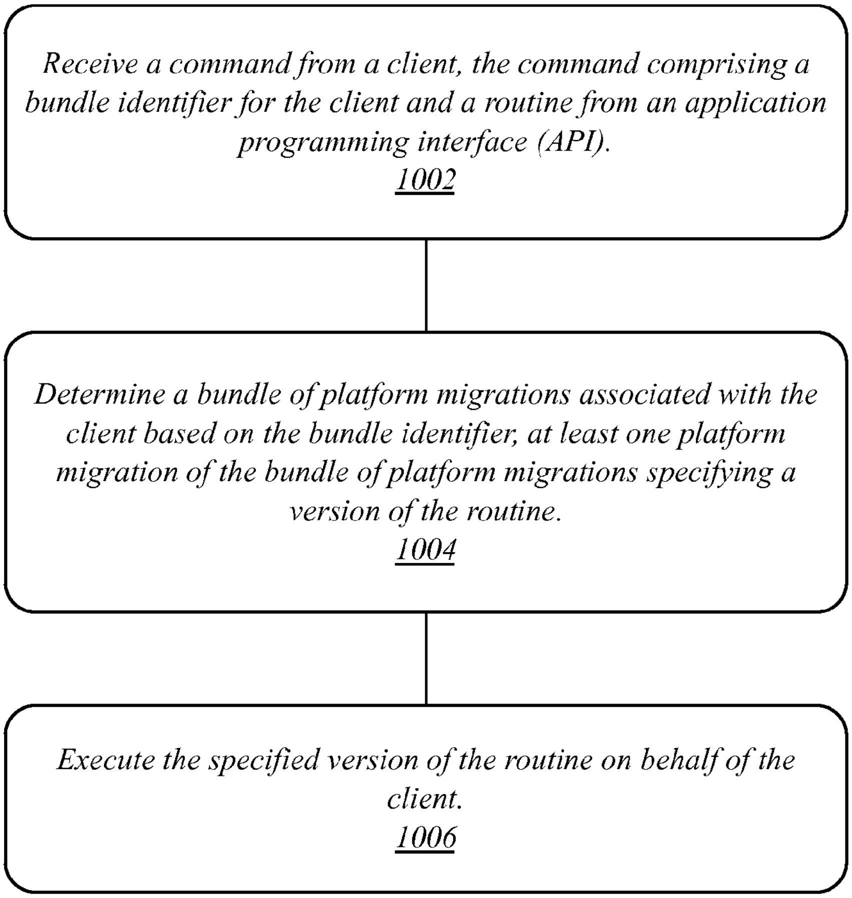

TECHNIQUES TO MANAGE PLATFORM MIGRATIONS

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to manage platform migrations. Some embodiments are particularly directed to techniques to manage platform migrations using selectable bundles of platform migrations corresponding to, or associated with, a particular version of a client application. In one embodiment, for example, an apparatus may comprise an interface component, a bundle component, and an execution component. The interface component may be operative to receive a command from a client, the command comprising a bundle identifier for the client. The bundle component may be operative to determine a bundle of platform migrations associated with the client based on the bundle identifier. The execution component may be operative to execute the command on behalf of the client based on the bundle of platform migrations. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 10 illustrates an embodiment of a logic flow for the execution system of FIG. 1.

DETAILED DESCRIPTION

Figure 1:
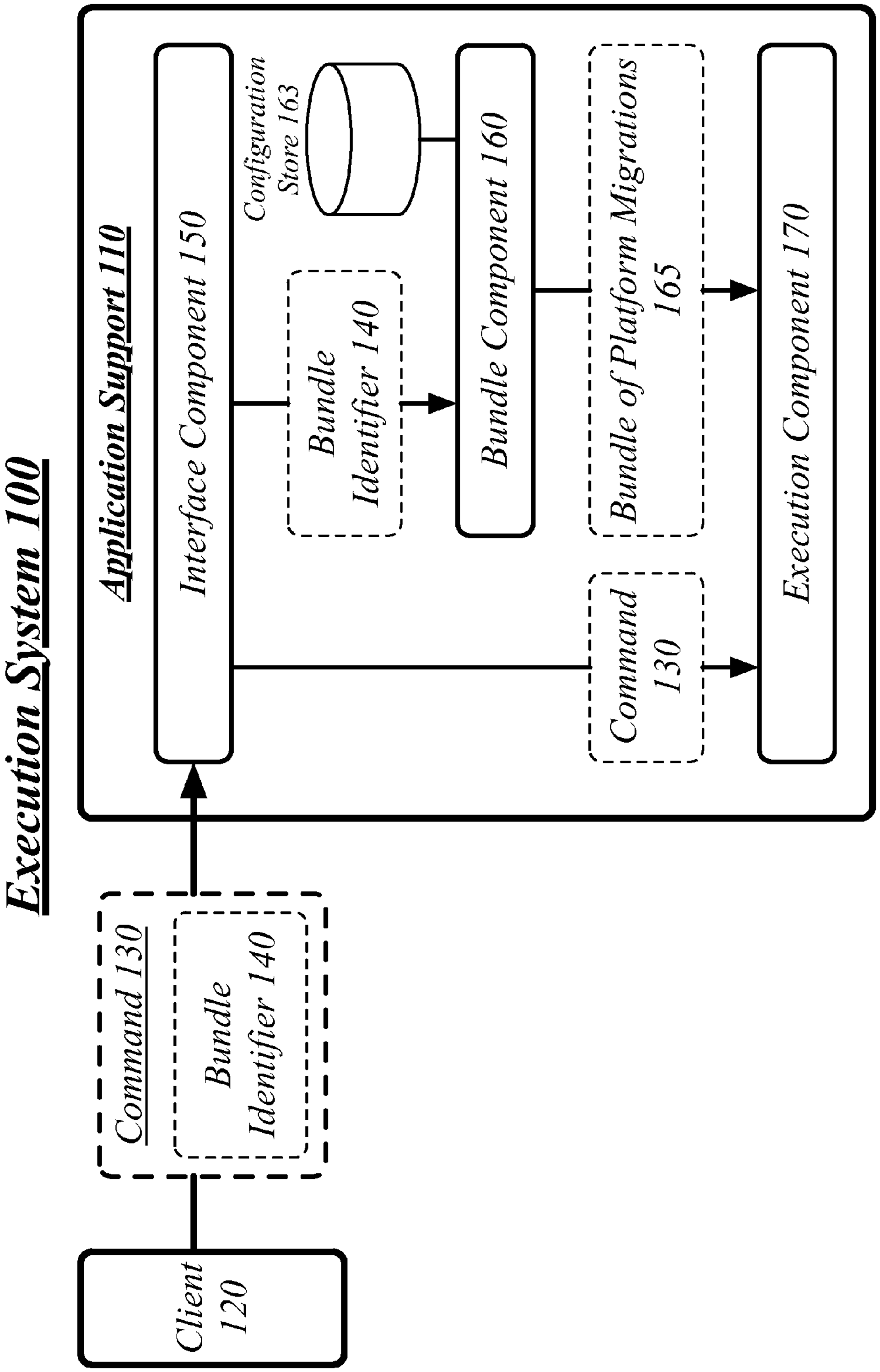
FIG. 1 illustrates an embodiment of an execution system.

Various embodiments are directed to techniques to manage platform migrations. Computer software generally execute on top of a platform, which provides services, abstracts computer hardware, ensures security, and generally provides defined behavior to application programs. When these platforms are updated, changed, or modified, the behavior of the platform from the perspective of an application may change. As such, applications may need to be modified to correctly interact with an updated platform. Providing application developers with control over when changes in platform behavior will be applied to their applications may ease this transition, allowing developers time to update their applications, to test updated applications, and to gradually roll out updates to various versions of an application. As such, the developer of a platform may introduce changes without fear of breaking applications, while developers may develop their applications without fear that the platform will break their application without warning. As a result, the embodiments can reduce the difficulties associated with introducing changes into a software platform.

In general, a platform may provide access to various resources, providing routines for interacting with the platform and standards for how data may be exchanged with the platform. For instance, the platform may provide one or more routines which may be used to manipulate the resources of the platform. The platform may provide definitions for data structures to define how data should be structured in interactions with the platform. In some cases routines and data structures may be combined together into object classes, specifying a structure for data in association with routines which manipulate or make use of that data. When any of these elements are changed, the platform may be said to be migrating from one set of behaviors to another set of behaviors. A platform migration may then collect together a set of changes in the behavior of a platform, which changes may include changes to routines, to data structures, to object classes, or to any other element of the platform. A platform migration may collect together changes made during a particular period of time, to a particular portion of the platform, or according to any other organizational scheme.

If a command is received from a client using the platform, the client may be said to be using a platform migration if the changes contained within the platform migration apply to the platform executing or responding to the command. An application written at a particular time may be written according to the behavior of a platform at that time. As the platform migrates one or more platform migrations may result. Some of these migrations may be applied to the application and some may not be. A specification of which platform migrations should be used when executing commands from an application may be referred to as a bundle of platform migrations. As such, a bundle of platform migrations for an application may comprise a specification of the behavior of the platform for that application within the granularity provided by the extent to which platform changes are divided into different platform migrations. For instance, if changes to a data structure defining how data should be organized for display are in a first platform migration, and changes to the parameter list for a routine for retrieving user data are in a second platform migration, a bundle of platform migrations may specify that the first platform migration should be used for a particular application but not the second platform migration. This bundle therefore customizes the behavior of the platform for that application using the new behavior for displaying data but the old behavior for retrieving user data. As a result, each application may experience a custom set of behaviors in the platform specified at the granularity of platform migrations. This may allow the developer of a platform to expose behavior customization to application developers while ensuring that related changes are grouped together and must be accepted or rejected as a whole.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an execution system 100. In one embodiment, the execution system 100 may comprise a computer-implemented execution system 100 having software application support 110 comprising one or more components. Although the execution system 100 shown in FIG. 1 has a limited number of elements in a certain topology, it may be appreciated that the execution system 100 may include more or less elements in alternate topologies as desired for a given implementation.

The execution system 100 may comprise application support 110. Application support 110 may be generally arranged to receive commands from clients and to execute the commands on behalf of clients using a predefined application programming interface (API). Application support 110 may comprise computer software, computer hardware, or a combination of the two. Application support 110 may comprise an interface component 150, a bundle component 160, and an execution component 170.

Interface component 150 may be operative to receive a command 130 from a client 120, the command 130 comprising a bundle identifier 140 for the client. A command 130 may comprise a request from the client 120 to application support 110 to have a task performed by the application support 110 on behalf of the client 120. Application support 110 may mediate access to hardware, software, stored data, a computer network, a service, or any other resource. Application support 110 may be operative to perform any task on behalf of a client 120 using the resource to which it mediates access.

The command 130 may comprise a software routine from an API. A routine may comprise a packaged sequence of instructions exposing predefined functionality to a client 120. As a platform migrates, a new version of this routine may be developed with different behavior—such as different inputs, different outputs, or any other form of behavior change. The new version of the routine may be included as part of a platform migration, this platform migration specifying that version of the routine for use. With multiple versions of the routine available, whether or not this new version of the routine will be used will depend on whether the platform migration specifying it is included in the platform migrations used by the client 120. Whether this platform migration is included will depend on the bundle identifier 140.

The bundle identifier 140 specifies a bundle of platform migrations 165 to be used in executing the command 130 on behalf of the client 120. A bundle identifier 140 may be specific to a particular client application being used by client 120 or may be useable by multiple or any client application to specify a set of behaviors for the platform.

Bundle component 160 may be operative to determine a bundle of platform migrations 165 associated with the client 120 based on the bundle identifier 140. For instance, bundle component 160 may use a configuration store 163 to manage a listing of active and inactive platform migrations associated with each bundle identifier. In some embodiments, only active platform migrations may be listed, only inactive platform migrations may be listed, or an active or inactive status may be listed for each platform migration.

In some embodiments, an entry in configuration store 163 may indicate for a bundle identifier 140 whether a developer has set each platform migration to be active or inactive, with a third state possible for where the developer has not specified that the platform migration should be active or inactive. In some embodiments, the bundle component 160 may be operative to exclude any platform migration from the bundle of platform migrations 165 if the entry in configuration store 163 for the bundle identifier 140 is set as either inactive or unspecified and to include any platform migration in the bundle of platform migrations 165 if the entry in configuration store 163 for the bundle identifier 140 is set as active.

Execution component 170 may operative to execute the command 130 on behalf of the client 120 based on the bundle of platform migrations 165. As the API for a platform defines rules and expectations for interacting with a platform, the selection of platform migrations corresponds to a specification for expected behavior for the platform. As such, the execution of the command 130 by the execution component 170 may comprise the platform performing in line with the expected behavior defined by the bundle of platform migrations 165. Where a platform migration describes a change in behavior by the platform, if the platform migration is selected in the bundle of platform migrations 165 then the new behavior will be used, and otherwise the old behavior will be used.

Where the command 130 comprises a routine from an API, at least one platform migration of the bundle of platform migrations 164 may specify a version of the routine. For instance, consider that a new version of the routine is included in a platform migration. If that platform migration is listed as active in the listing for bundle identifier 140, then the new version of the routine may be used in executing the command 130. If that platform migration is listed as inactive (or, in some embodiments, neither specified as active nor inactive) then an old version of the routine, rather than the new version, may be used in executing the command 130. In general, where the command 130 comprises a routine from an API and at least one platform migration of the bundle of platform migrations 164 specifies a version of the routine, the execution component 170 may be operative to execute the specified version of the routine on behalf of the client 120.

Figure 2:
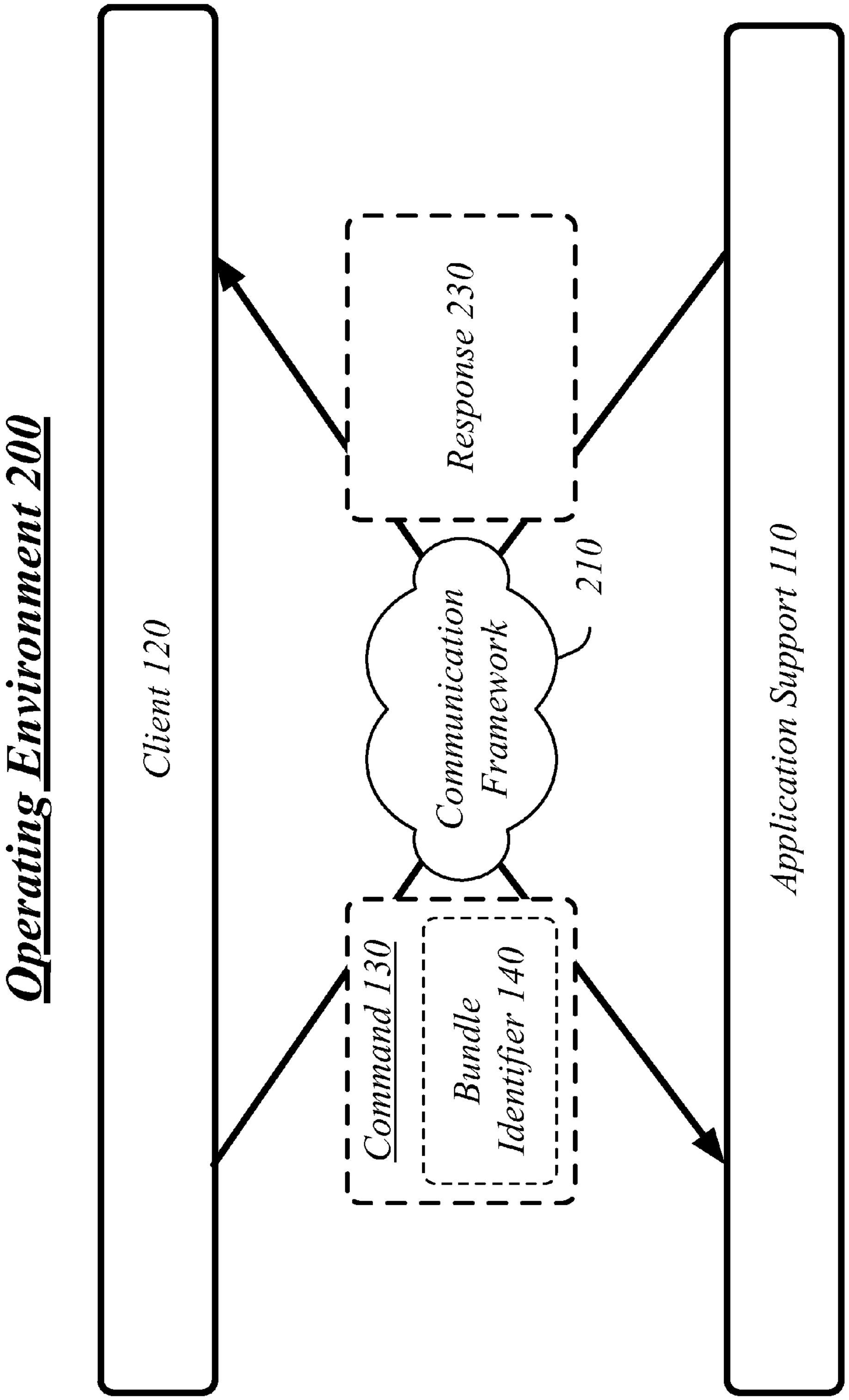
FIG. 2 illustrates an operating environment for the execution system in which a communication framework is used.

FIG. 2 illustrates an embodiment of an operating environment 200 for the execution system 100. As shown in FIG. 2, the client 120 and application support 110 communicate using a communication framework 210.

The communication framework 210 may comprise any technique or system for communicating between a client 120 and application support 110. In some embodiments, the communication framework 110 may comprise a communication framework 110 for communication between a software application on a device and a service, other application, or component on the device providing support for the application. In some embodiments, application support 110 may support an Internet-based service. The interface component 150 may be operative to receive the command 130 over the Internet and to respond to the command 130 over the Internet.

Executing a command 130 may comprise storing, modifying, deleting, or otherwise manipulating a resource, data on a resource, or any element of a resource. Executing a command 130 may comprise retrieving information from a resource or determining information based on a resource. For instance, in some embodiments, application support 110 may support a Web-based service. The command 130 may therefore comprise a request to perform a task on the Web-based service. In some embodiments, the application support 110 may be support for a social-networking service. The command 130 may therefore comprise a request to perform a task on the social-networking service.

The application support 110 may return a response 230 to the command 130. For instance, if the command 130 includes a request for data, the response 230 may comprise the requested data. Alternatively, even if the command 130 does not request data be returned, the response 230 may comprise a notification that a requested command 130 was carried out. For instance, a command 130 comprising a request to a social networking service for a friends list for a user may engender a response 230 comprising the requested friends list. Similarly, a command 130 comprising a request to a social networking service to post a status update may not need data to be returned in response but may still instigate a response 230 confirming that the status update was posted.

Figure 3:
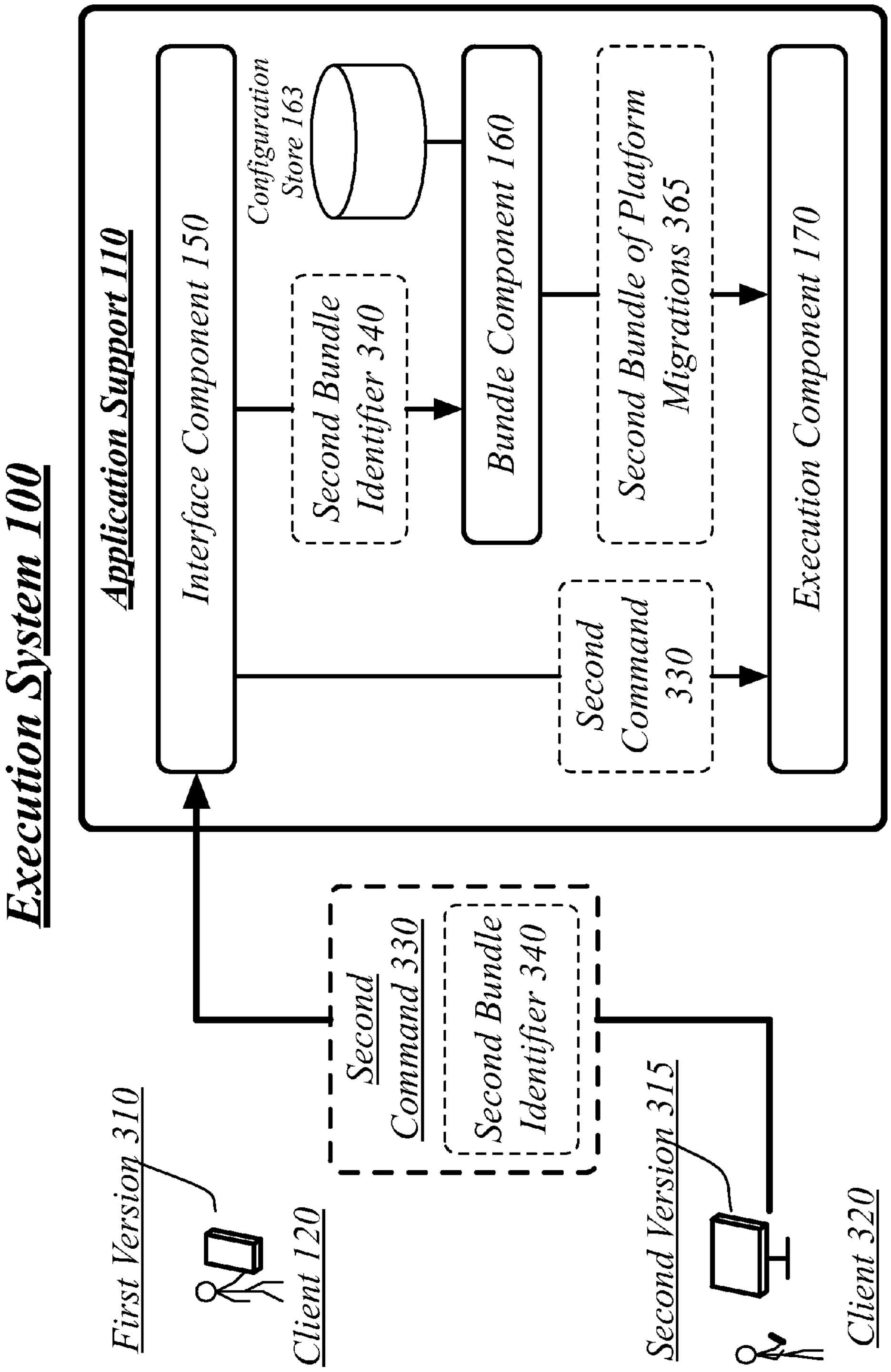
FIG. 3 illustrates a second block diagram of the execution system including a second client.

FIG. 3 illustrates a second block diagram of execution system 100. As shown in FIG. 3, a second client 320 is interacting with application support 110.

The client 120 may be a device running a client application. For example, if application support 110 supports an Internet-based service, such as a social-networking service, then the client 120 may be a client application associated with the Internet-based service for accessing the Internet-based service. Alternatively, the client application may simply interact with the Internet-based service as part of the functionality it offers to the use. For example, a game application, media application, or any other application may provide updates to a social-networking service, retrieve lists of friends from a social-networking service, or generally interoperate with the social-networking service to extend a user's behavior with the client application to the social-networking service.

This client application may be available in multiple versions, for instance a first version 310 and a second version 315. In some cases, these may represent different versions for use on different types of devices. For instance, the first version 310 may be for use with mobile devices, such as a smartphones, while the second version 315 may be for use with smart televisions. Additionally, multiple versions may represent different editions of a single product, such as a freeware version and a paid version. Similarly, multiple versions may represent different iterations of the same client application on the same platform, such as a previous version and a new version. For example, a developer may decide to use a new bundle identifier with a new version of a client application in order to test the new version with a different bundle of platform migrations, such as where the new version is intended to update the client application to support newly-introduced platform migrations.

As such, the client 120 may comprise a first version 310 of a client application, the bundle identifier 140 associated with the first version 310 of the client application. A second bundle identifier 340 may be associated with a second version 315 of the client application, a second client 320 comprising the second version 315 of the client application. The interface component 150 may be operative to receive a second command 330 from the second client 320. The bundle component 160 may be operative to determine a second bundle of platform migrations 365 based on the second bundle identifier 340, the second bundle of platform migrations 365 distinct from the first bundle of platform migrations 165. The execution component 170 may be operative to execute the second command 330 based on the determined second bundle of platform migrations 365.

The second bundle of platform migrations 365 being distinct from the first bundle of platform migrations 165 may comprise the second bundle of platform migrations 365 including or excluding at least one platform migration that is, respectively, excluded or included in the first bundle of platform migrations 165. The second bundle of platform migrations 365 may generally indicate that application support 110 should exhibit different behavior than when behaving according to the first bundle of platform migrations 165. In general, executing the second command 330 based on the determined second bundle of platform migrations 365 may be generally similar to executing the command 130 based on the determined bundle of platform migrations 165 excepting the change in behavior request by the differences in the bundles of platform migrations.

Figure 4:
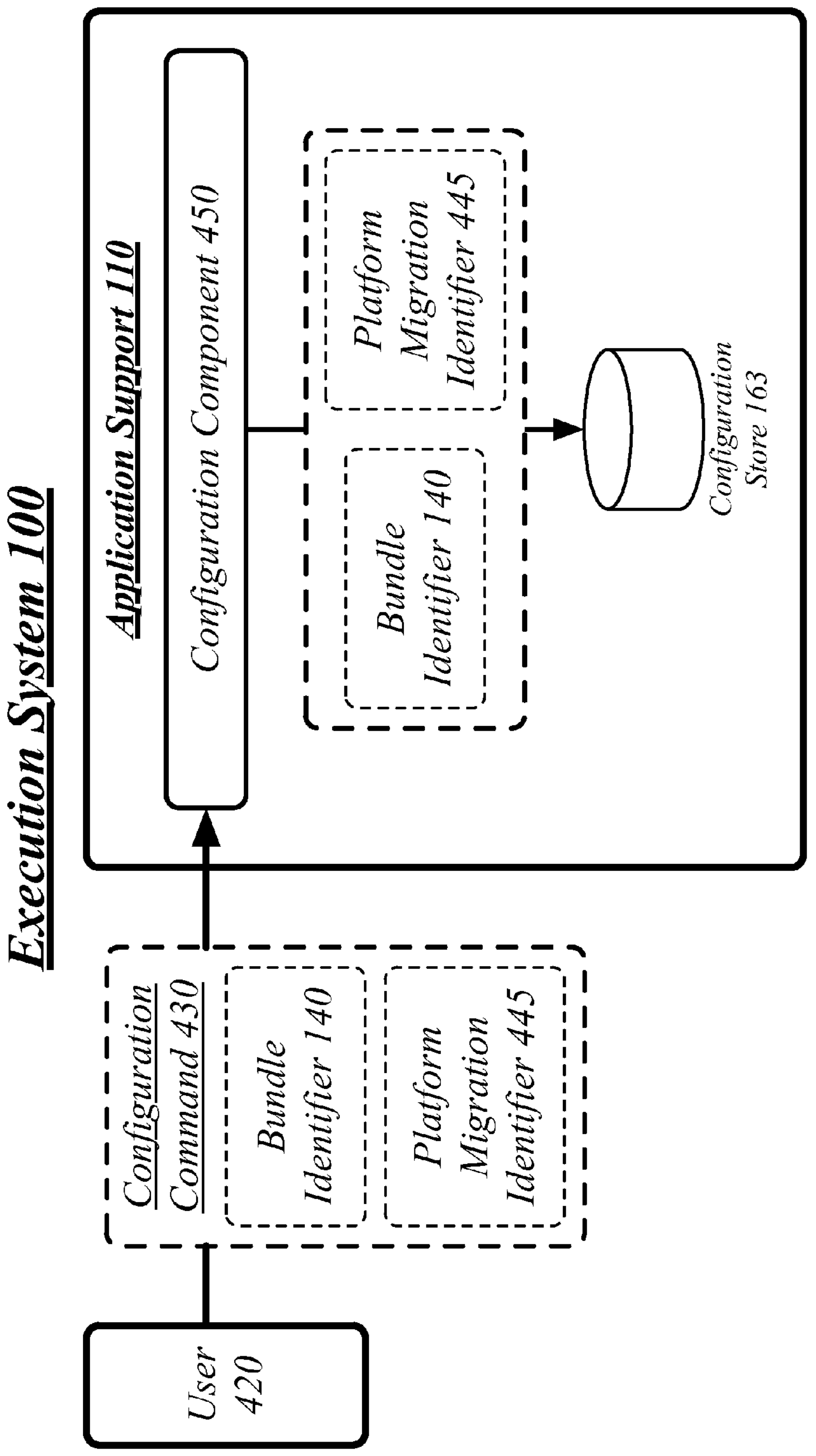
FIG. 4 illustrates a third block diagram of the execution system including a configuration component.

FIG. 4 illustrates a third block diagram of execution system 100. As shown in FIG. 4, application support 110 include a configuration component 450 used to manage which platform migrations are associated with a bundle identifier.

A user 420 of application support 110, such as a developer of a client application, may wish to change the platform migrations included in the bundle of platform migrations 165 associated with the client application. For instance, a developer may have determined through testing that a platform migration will not break the client application and consequently indicate to application support 110 that the platform migration should be used when executing commands from the client application.

As such, the configuration component 450 may be operative to receive a configuration command 430 from a user 420 to activate a first platform migration for the client 120 and to include the first platform migration in the bundle of platform migrations 165 identified by the bundle identifier 140. In some cases, a platform migration identifier 445 will be used to identify the platform migration. In some cases, the platform migration identifier 445 may comprise an absolute identifier, wherein an identifier is assigned to each platform migration that is distinct from the identifier of any other platform migration.

However, in some cases the platform migration identifier 445 may be relative. For instance, a user 420 may be presented with a list of platform migration identifiers not currently active for a particular client application they manage with the platform migration identifier 445 indicating that a particular entry in that list should be included in the bundle of platform migrations 165 for the client application. For example, the configuration component 450 may be Web-accessible such as through a developer configuration page provided by the maintainer of the platform for which application support 110 provides support. A developer may be presented with a configuration page for a client application and be able to activate or deactivate platform migrations within the bundle of platform migrations 165 associated with the client application.

Figure 5:
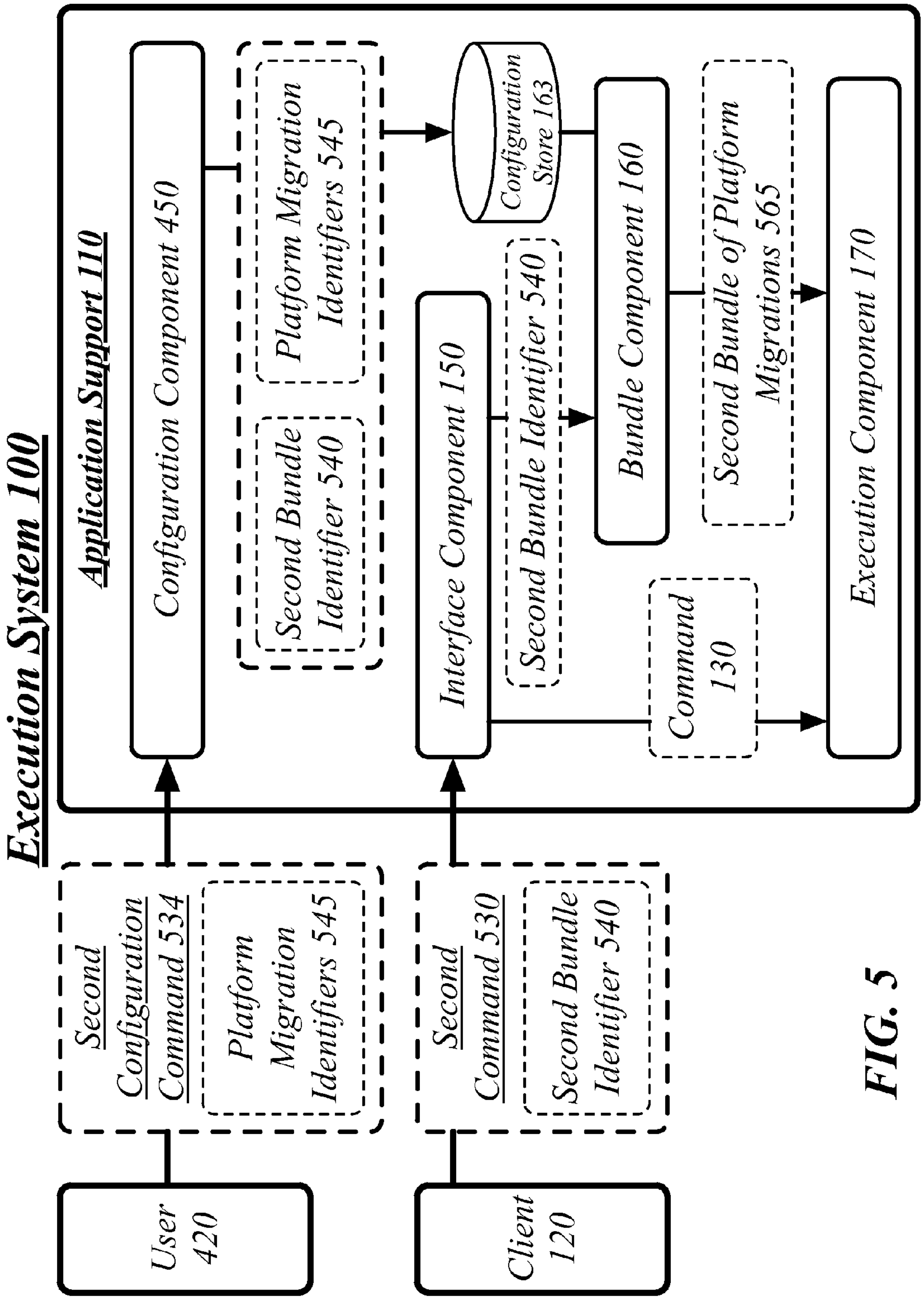
FIG. 5 illustrates a fourth block diagram of the execution system in which a configuration command is received.

FIG. 5 illustrates a fourth block diagram of execution system 100. As shown in FIG. 5, a user 420 is setting up a second bundle identifier 540 for use with their client application.

A user 420, such as a developer of a client application, may desire to set up a second bundle identifier 540 for use with their client application. This second bundle identifier 540 may be used to support a new iteration of the client application, such as a new version with new functionality, a new version on a new device, or any other reason for creating a different bundle identifier for a client application.

It will be appreciated that the distinction between two separate client applications and two versions of the same client application may depend on context. Two different versions of the same client application will contain some portion of differing code or data. Two separate client applications may share code, such as due to the use of libraries, standard implementations, code reuse, and so on. In some cases, the distinction between two versions of the same client application may entirely rest with the developer. However, the platform supported by application support 110 may also introduce distinctions. For instance, client applications may be assigned identifiers (distinct from the bundle identifiers) to identify them. These identifiers may have security implications, such as by granting access to some portion of user data, being used to identify that a user has granted a client application access to some portion of user data, or being used to deny access to some portion of user data.

To aid in creating a second bundle identifier 540 for the client application the configuration component 450 may be operative to receive a second configuration command 534 from a user 420 to create a second bundle identifier 540 for the client 120 and to create a second bundle of platform migrations 565 associated with the client 120 identified by the second bundle identifier 540. The second bundle of platform migrations 565 may be specified in whole by the user 420, such as by receiving a set of platform migration identifiers 545 listing all active platform migrations, all inactive platform migrations, or all platform migrations with a specification of whether each is active or inactive. Alternatively, the user 420 may include platform migrations identifiers 545 indicating a relative change from the first bundle of platform migrations 165 previously associated with the client application.

In some cases, the creation of a second bundle identifier 540 may be a distinct step from the specification of what platform migrations should be in the second bundle of platform migrations 565. For instance, the configuration component 450 may be operative to receive a command to create a second bundle identifier 540 for use with the client application and may initially set the second bundle of platform migrations 565 to contain the same platform migrations as the bundle of platform migrations 165 associated with a previous bundle identifier 140 for the client application. The configuration component 450 may then be operative to receive configuration commands to modify this second bundle of platform migrations 365, such as is described with reference to FIG. 4. In some embodiments, the user 420 may specify the new second bundle identifier 540 for use with the client application and in some embodiments the configuration component 450 may determined the second bundle identifier 540.

In some embodiments, at least one platform migration of the second bundle of platform migrations 565 may specify a second version of a routine from an API, wherein the first bundle of platform migrations 165 specified a different, first version of the routine. The interface component 150 may be operative to receive a second command 530 from the client, the second command 530 comprising the second bundle identifier 540 for the client. The bundle component 160 may be operative to determine the second bundle of platform migrations 565 based on the second bundle identifier 540. The execution component 170 may be operative to execute the specified second version of the routine on behalf of the client 120. As such, the second bundle identifier 540, when used by the client application, allows for the specification that the second version of the routine should be used for executing the command rather than the first version of the routine.

Figure 6:
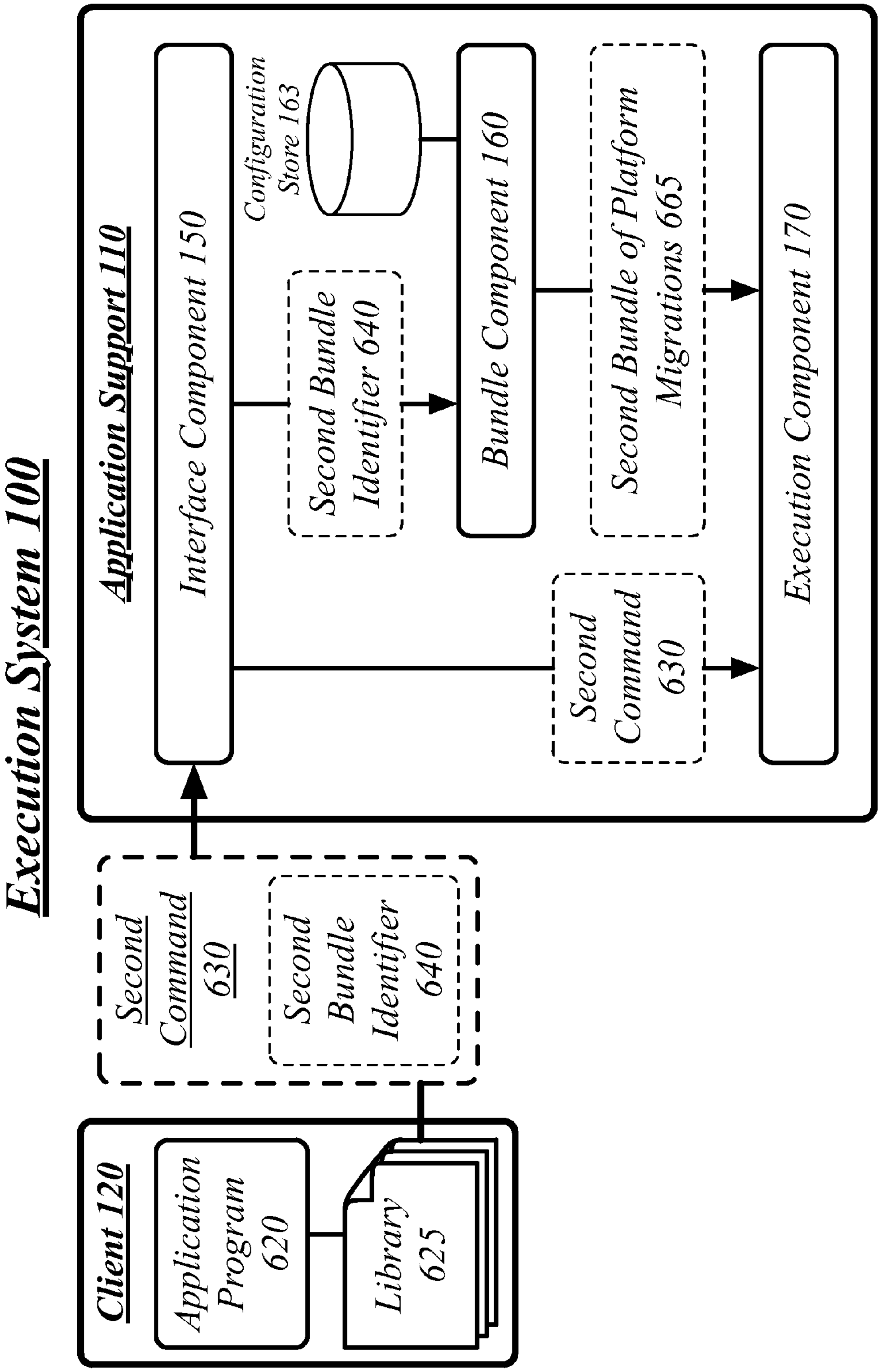
FIG. 6 illustrates a fifth block diagram of the execution system in which a client application program is built on top of a library.

FIG. 6 illustrates a fifth block diagram of execution system 100. As shown in FIG. 6, the client 120 comprises both an application program 620 and a library 625.

A client application interacting with execution system 100 may make both direct and indirect use of an API for the execution system 100, as provided by application support 110. In direct use, the application program 620 may directly send commands to application support 110, wherein the code of the application program 620 itself carries out the interaction with applications support 110.

In indirect use, application program 620 may rely on a library 625 to provide an abstraction of the API for the execution system 100, the library 625 itself possibly having an API for interacting with the library 625. In some cases, the library 625 may be a static library, compiled into a union with application program 620 to produce the client application. In some cases, the library 625 may be a shared library, wherein elements of the library 625 are only loaded into the client application at run time or load time. In either case, the library 625 may have a different developer than application program 620.

Because library 625 may have a different developer than application program 620, it may be inconvenient to update the library 625 and the application program 620 simultaneously to support exactly the same platform migrations. As such, it may be desirable to allow the application program 620 and library 625 to use different bundle identifiers. As such, the first bundle identifier 140 may be associated with the application program 620, the first bundle identifier 140 included in any command sent to application support 110 by the code of application program 620. A second bundle identifier 640 may be associated with the library 625, the second bundle identifier 620 included in any command sent to application support 110 by the code of library 625. As such, the application program 620 and library 625 may be updated independently of each other, with a change to the platform migrations used by one being independent of the platform migrations used by the other.

Consequently, the interface component 150 may be operative to receive a second command 630 from the client 120 comprising the second bundle identifier 640 associated with the library 625. The bundle component 160 may be operative to determine a second bundle of platform migrations 665 based on the second bundle identifier 640, the second bundle of platform migrations 665 distinct from the first bundle of platform migrations 165. The two bundles being distinct may merely comprise one or more platform migrations being active in one bundle and inactive or unset in the other. The execution component 170 may be operative to execute the second command 630 based on the determined second bundle of platform migrations 665.

Figure 7:
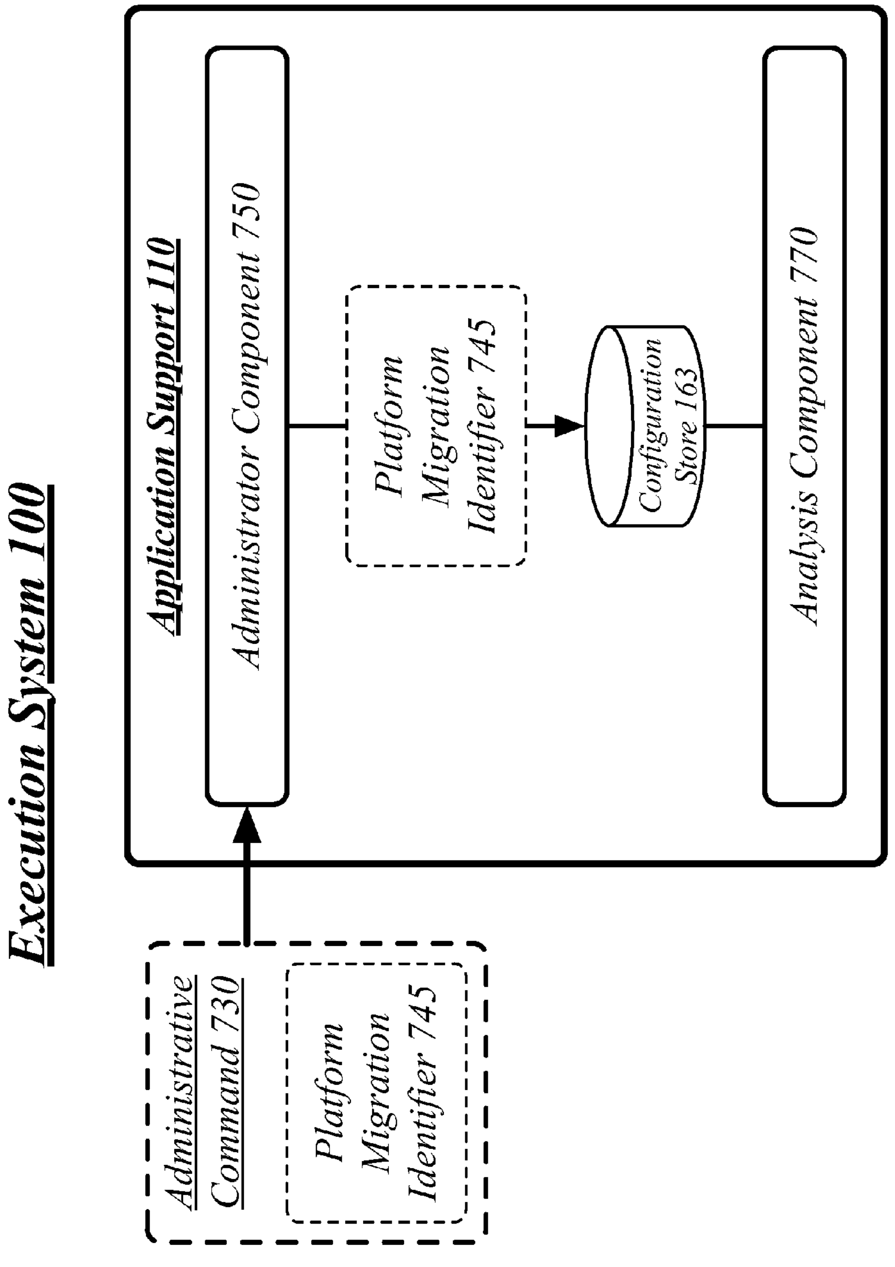
FIG. 7 illustrates a sixth block diagram of the execution system including an administrator component and analysis component.

FIG. 7 illustrates a sixth block diagram of execution system 100. As shown in FIG. 7, the execution system 100 may include an administrator component 750 and an analysis component 770.

The developer, maintainer, or other entity with administrative power over application support 110 may introduce new platform migrations into execution system 100 and may desire to deprecate old platform migrations from being supported by application support 110. New platform migrations are the mechanism by which the platform evolves. Some of the changes in a platform may involve adding new functionality, such that client applications not using the new functionality might be allowed to exclude a platform migrations indefinitely.

However, some platform migrations might ultimately be desirable to make mandatory. Fixing a bug may include changing behavior the client applications depended on. A routine may accept parameters, or generally be configured, in a way that exposes a security problem, necessitating a change to what parameters are accepted. A routine may prove costly to execute and be replaced by a new routine that returns partial results and expects the client to perform post-processing to match the output of the execution component 170 when executing the old routine. Any of these changes, and others, may make desirable an optional period in which use of a platform migration is optional in order to give developers time to update clients. However, because these changes are cases in which the maintainer of application support 110 sees a benefit to eventually disallowing the use of the old platform behavior, the maintainer may desire in making the associated platform migrations mandatory.

As such, an administrator component 750 may be operative to receive a new platform migration, such as through an administrative command 730 comprising a platform migrations identifier 745 and the platform migration itself, and to include this platform migration in the set of platform migrations available to clients. The administrator component 750 may be operative to automatically or programmatically set the new platform migration as inactive for all current bundles of platform migrations, including the bundle of platform migrations 165 identified by the bundle identifier 140 in configuration store 163. Automatically setting the new platform migration to inactive prevents breaking existing client applications while making the new platform migration available for testing and eventual use by client applications.

An analysis component 770 may be used to track usage of the new platform migration and to decide when and whether to make use of the new platform migration mandatory. This decision may be made based on a combination of a predefined period of time defining an optional-use period for the new platform migration and the current usage of the new platform migration. For instance, a metric may be used that represents the exclusion of the new platform migration from bundles of platform migrations. This metric may comprise a percentage of bundles of all bundles which exclude the new platform migration. This metric may comprise a percentage of commands received from clients using a bundle identifier associated with a bundle which excludes the new platform migration. This metric may include any appropriate metric for measuring exclusion of the new platform migration, may comprise a combination of metrics, such as a weighted combination, and different metrics may be used for different platform migrations.

In general, the analysis component 770 may be operative to extend an optional-use period for the new platform migration based on a determination that a metric representing the exclusion of the new platform migration from bundles of platform migrations by clients exceeds a threshold. Similarly, the analysis component 770 may be operative to mandate the use of the new platform migration by all clients based on an expiration of an optional-use period and a determination that a metric representing the exclusion of the new platform migration from bundles of platform migrations by clients falls shorts of a threshold. This threshold may be set specifically for the new platform migration or may be a global value used by multiple or all platform migrations. Similarly, the duration of the optional-use period may be set specifically for the new platform migration or may be a global value used by multiple or all platform migrations. For instance, a platform migration which corrects a significant security flaw, which significantly reduces resource-usage, or which is otherwise considered important may be assigned a higher threshold for increasing the optional-use period and may be assigned a shorter optional-use period. Likewise, the contrary, such as a platform migration that primarily introduces new functionality, may be assigned a lower threshold for increasing the optional-use period and may be assigned a longer optional-use period.

In some cases, specific bundle identifiers, specific client applications, or specific clients may be exempted from the data-gathering of the analysis component 770 or any mandate imposed by the analysis component 770. For instance, it may be known that a particular client application that interacts with the execution system 100 is particularly popular and that a developer of the particular client application is disinclined to modify their client application to use the platform migration. As such, the maintainer of application support 110 may decide to exempt this particular client application from any mandated use of the platform migration in order to avoid breaking a popular application. Similarly, the maintainer of application support 110 may decide to exempt this particular client application, and any associated bundle identifiers and uses of these bundle identifiers, from data gathering, so that the instigation of mandatory use of the platform migration may proceed independent of a client application upon which mandatory use would not be mandated anyways.

Figure 8:
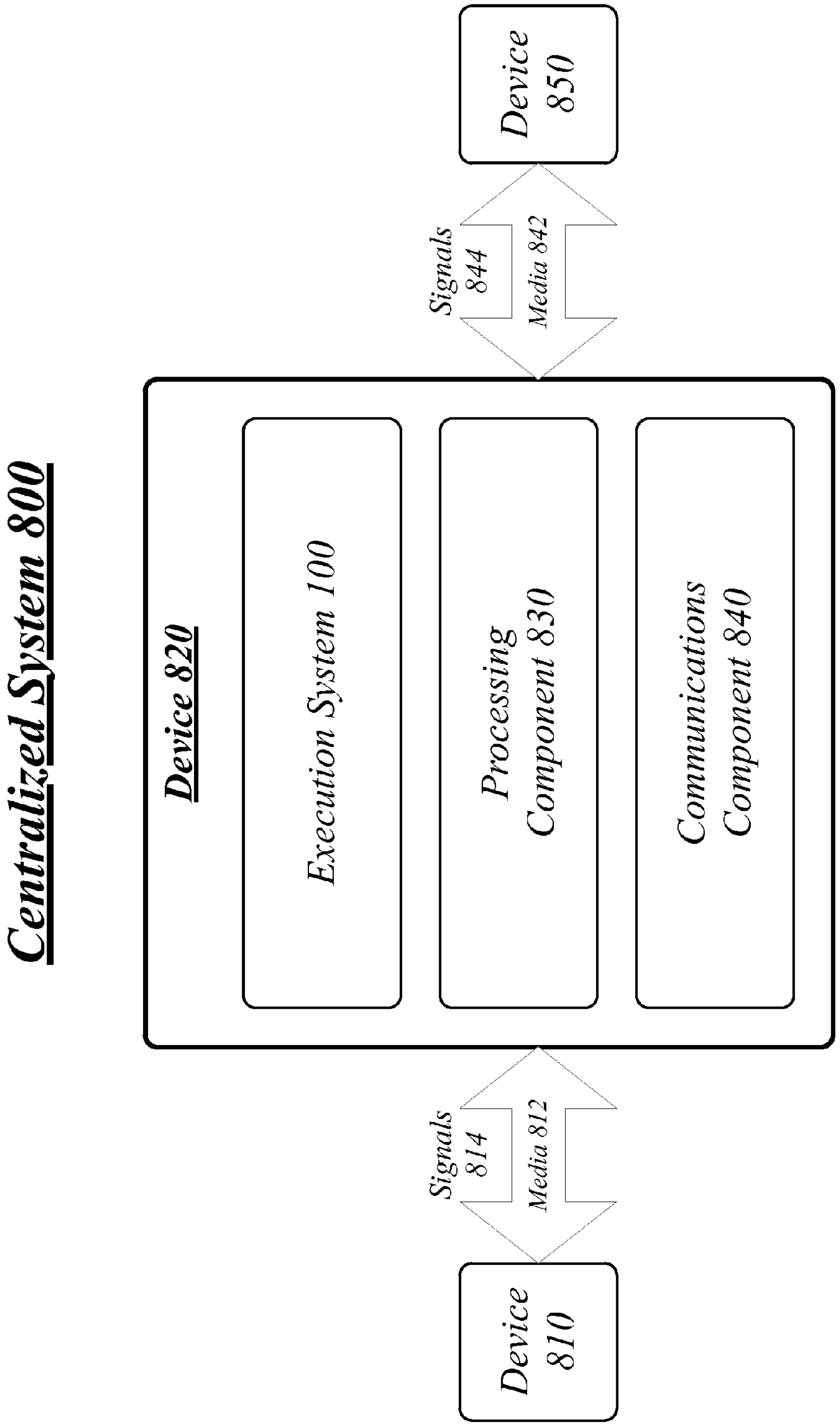
FIG. 8 illustrates an embodiment of a centralized system for the execution system of FIG. 1.

FIG. 8 illustrates a block diagram of a centralized system 800. The centralized system 800 may implement some or all of the structure and/or operations for the execution system 100 in a single computing entity, such as entirely within a single device 820.

The device 820 may comprise any electronic device capable of receiving, processing, and sending information for the execution system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the execution system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the execution system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with other devices 810, 850 over a communications media 812, 842, respectively, using communications signals 814, 844, respectively, via the communications component 840. The devices 810, 850 may be internal or external to the device 820 as desired for a given implementation.

For example, device 810 may correspond to client 120 such that signals 814 sent over media 812 comprise the sending of command 130 to execution system 100 by client 120 and sending of response 230 from execution system 100 to client 120. Similarly, device 850 may correspond to client 320 such that signals 844 sent over media 842 comprise the sending of second command 330 to execution system 100 and sending of a response from execution system 100 to client 320. In various situations, device 810 and device 850 may comprise distinct categories of device, such as two or more of smartphone, personal computer, web platform, and embedded device. In various situations, device 810 and device 850 may comprise the same type of device running different versions of a client application. In various situations, device 810 and device 850 may comprise similar devices running the same version of the client application.

Figure 9:
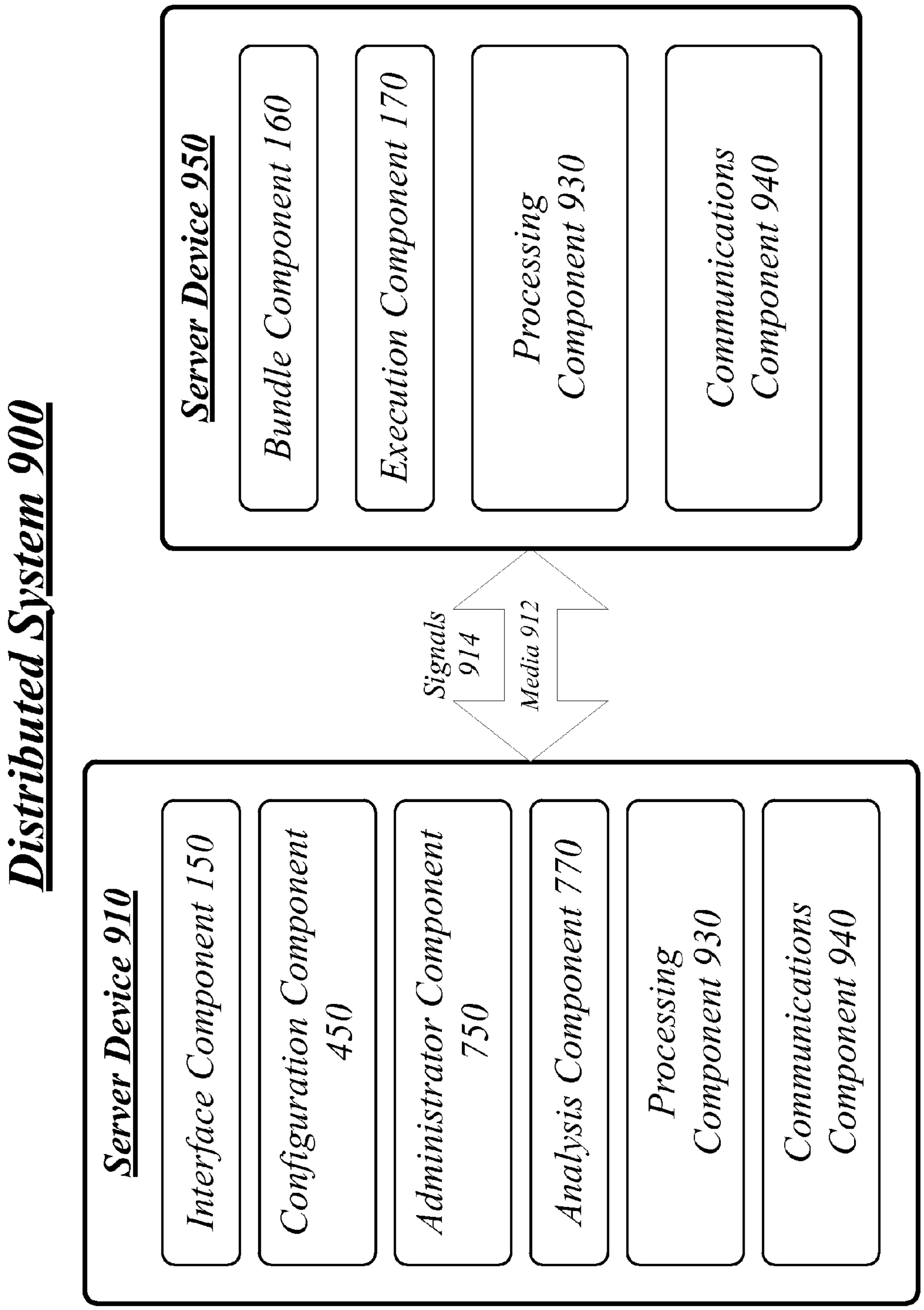
FIG. 9 illustrates an embodiment of a distributed system for the execution system of FIG. 1.

FIG. 9 illustrates a block diagram of a distributed system 900. The distributed system 900 may distribute portions of the structure and/or operations for the execution system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a server device 910 and a server device 950. In general, the server device 910 and the server device 950 may be the same or similar to the device 820 as described with reference to FIG. 8. For instance, the server device 910 and the server device 950 may each comprise a processing component 930 and a communications component 940 which are the same or similar to the processing component 830 and the communications component 840, respectively, as described with reference to FIG. 8. In another example, the devices 910, 950 may communicate over a communications media 912 using communications signals 914 via the communications components 940.

The server device 910 may comprise or employ one or more client programs that operate to perform various methodologies in accordance with the described embodiments. In one embodiment, for example, the client device 910 may a front-end for an Internet-based service. The server device 910 may implement interface component 150, configuration component 450, administrator component 750, and analysis component 770, and thereby generally managing the reception of commands, sending of responses, and management of bundles of platform migrations.

The server device 950 may comprise or employ one or more server programs that operate to perform various methodologies in accordance with the described embodiments. In one embodiment, for example, the server device 950 may implement bundle component 160 and execution component 170 and thereby generally serve to actually execute the commands received from clients and generate the corresponding responses according to the behavior described by stored bundles of platform migrations.

It will be appreciated, however, that any combination of components may be executed by any combination of computing devices. Similarly, it will be appreciated that a single component may be executed by multiple computing devices.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 10 illustrates one embodiment of a logic flow 1000. The logic flow 1000 may be representative of some or all of the operations executed by one or more embodiments described herein.

In the illustrated embodiment shown in FIG. 10, the logic flow 1000 may, at block 1002, receive a command 130 from a client 120, the command 130 comprising a bundle identifier 140 for the client and a routine from an application programming interface (API). The command 130 may be received from a client application running on the client 120, the client 120 only one of many instantiations of the client application. This client application may expect a specific set of behavior from the application support 110 for an execution system 100, the bundle identifier 140 identifying an entry in a configuration store 163 containing the information needed by the execution system 100 to know the expected set of specific behaviors.

The command 130 may be received via any technique for receiving a command. For instance, the command 130 may be received over the Internet. The command 130 may be received by an operating system on a device 810 or 850, and executed by an execution component 170 of the operating system. The command 130 may be received by another application running on device 810 or 850 and executed by that other application.

The logic flow 1000 may, at block 1004, determine a bundle of platform migrations 165 associated with the client 120 based on the bundle identifier 140, at least one platform migration of the bundle of platform migrations 165 specifying a version of the routine. As platform migrations encapsulate changes in a platform, a platform migration may specify a version of a routine that is used when that platform migration is active, that version of a routine different a previous version of the routine in place prior to the specific platform migration.

It will be appreciated that a platform migration specifying a version of routine may not directly correspond to an immediate indication in a platform migration record that a specific software routine is to be used. It may, alternatively, comprise a platform migration record indicating a class, a file, a set of files, a library, a version of a library, or any other technique which culminates in one routine being used instead of another. In general, a platform migration specifying a specific routine may correspond to what routine gets executed in response to a particular command 130 being dependent on whether or not that platform migration is active in the bundle of platform migrations 165.

The logic flow 1000 may, at block 1006, execute the specified version of the routine on behalf of the client 120. Executing the specific version of the routine may comprise using a routine in a library, in a class, in a file, in a object file, or any other technique for executing a routine. The routine may be executed with one or more input parameters, one or more of the input parameters specified as part of command 130 and/or one or more of the input parameters specified by application support 110. For instance, application support 110 may specify input parameters based on a platform migration included as part of a bundle of platform migrations 165.

The embodiments are not limited to this example.

Figure 11:
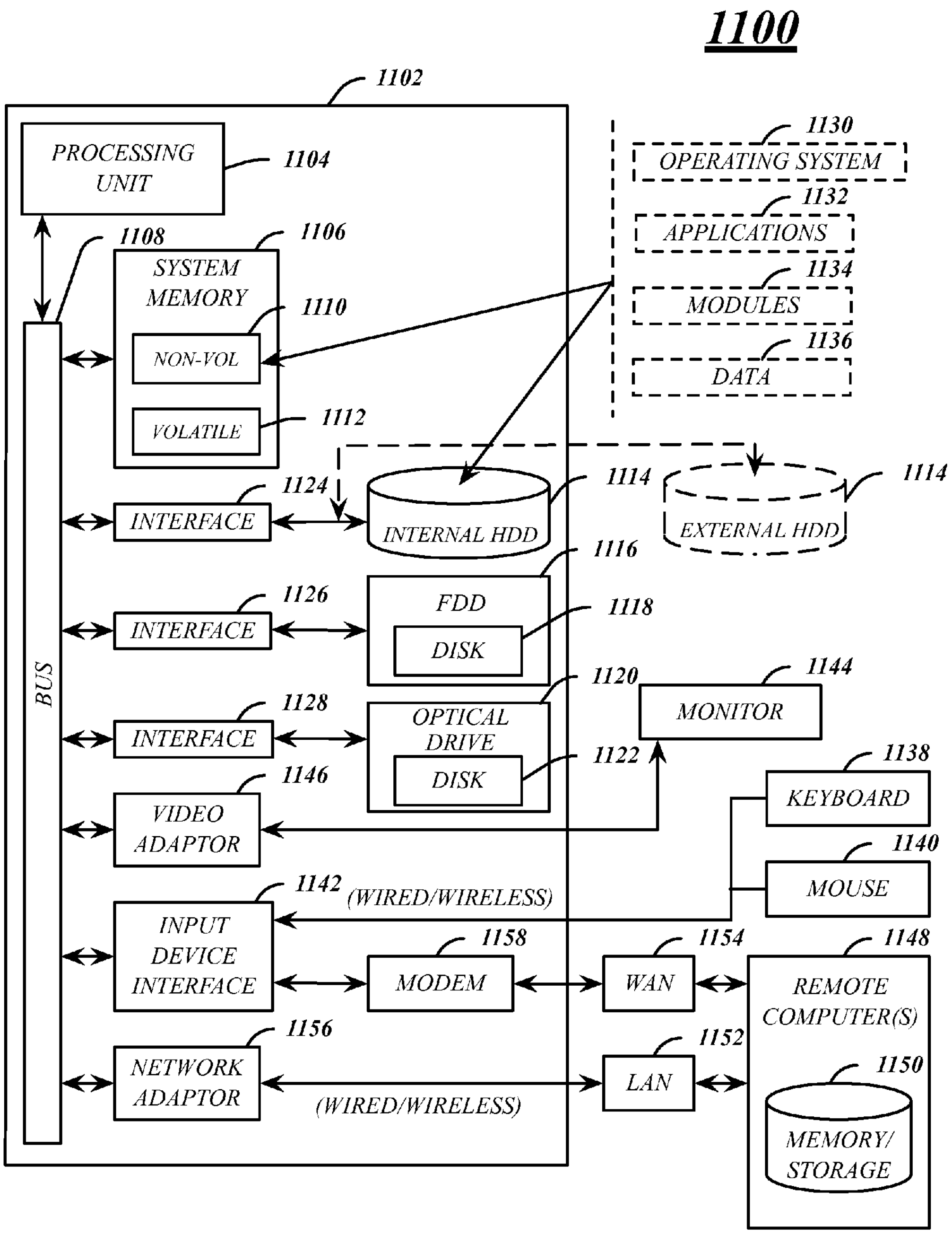
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD®, Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures.

Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the execution system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
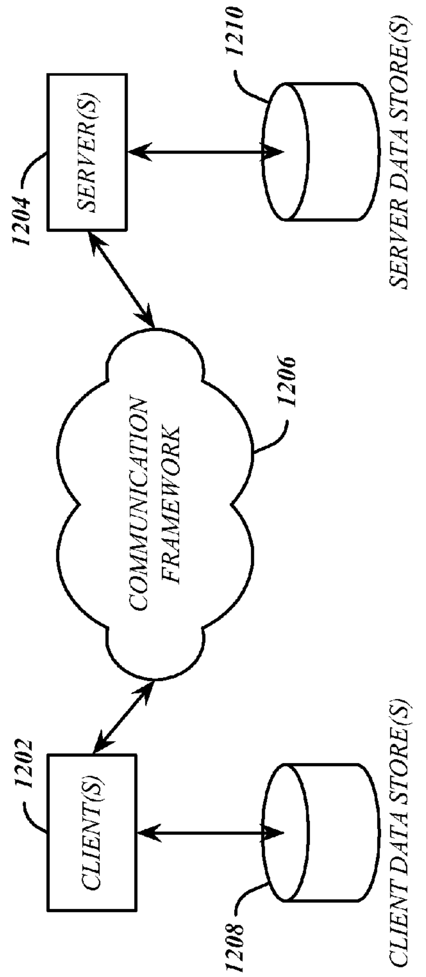
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:

a processor circuit;

an administrator component configured to add a new platform migration to a set of platform migrations available to a client, the new platform migration comprising a version of a routine from an application programming interface (API);

an analysis component operative on the processor circuit to mandate use of the new platform migration if the analysis component determines that an optional-use period has expired and that a metric comprising a percentage of commands from clients which exclude the new platform migration from bundles of platform migrations falls short of a threshold;

an interface component operative on the processor circuit to receive a command from a client, the command comprising a bundle identifier for the client and an identification of the routine, the bundle identifier identifying a bundle of platform migrations that define custom behaviors;

a bundle component operative on the processor circuit to determine a bundle of platform migrations associated with the client based on the bundle identifier, at least one platform migration of the bundle of platform migrations specifying a version of the routine; and an execution component operative on the processor circuit to execute the version of the routine in the new platform migration on behalf of the client if the new platform migration is mandated, or to execute the version of the routine specified in the requested bundle of platform migrations if the new platform migration is not mandated.

2. The apparatus of claim 1, the client comprising a first version of a client application, the bundle identifier associated with the first version of the client application, wherein a second bundle identifier is associated with a second version of the client application, a second client comprising the second version of the client application, the interface component operative to receive a second command from the second client, the bundle component operative to determine a second bundle of platform migrations based on the second bundle identifier, the second bundle of platform migrations distinct from the first bundle of platform migrations, the execution component operative to execute the second command based on the determined second bundle of platform migrations.

3. The apparatus of claim 1, comprising:

a configuration component operative on the processor circuit to receive a configuration command from a user to activate a first platform migration for the client and to include the first platform migration in the bundle of platform migrations identified by the bundle identifier.

4. The apparatus of claim 2, comprising:

a configuration component operative on the processor circuit to receive a second configuration command from a user to create a second bundle identifier for the client and to create a second bundle of platform migrations associated with the client identified by the second bundle identifier, at least one platform migration of the bundle of platform migrations specifying a second version of the routine;

the interface component operative to receive a second command from the client, the second command comprising the second bundle identifier for the client;

the bundle component operative to determine the second bundle of platform migrations based on the second bundle identifier;

the execution component operative to execute the specified second version of the routine on behalf of the client.

5. The apparatus of claim 1, the client comprising a application program and a software library used by the application, the bundle identifier associated with the application program and a second bundle identifier associated with the library, the interface component operative to receive a second command from the client comprising the second bundle identifier associated with the library, the bundle component operative to determine a second bundle of platform migrations based on the second bundle identifier, the second bundle of platform migrations distinct from the first bundle of platform migrations, the execution component operative to execute the second command based on the determined second bundle of platform migrations.

6. The apparatus of claim 1, comprising:

an administrator component operative on the processor circuit to receive a new platform migration and to automatically set the new platform migration as inactive in the bundle of platform migrations identified by the bundle identifier.

7. The apparatus of claim 6, comprising:

an analysis component operative on the processor circuit to extend an optional-use period for the new platform migration based on a determination that a metric representing the exclusion of the new platform migration from bundles of platform migrations by clients exceeds a threshold.

8. A computer-implemented method, comprising:

adding a new platform migration to a set of platform migrations available to a client, the new platform migration comprising a version of a routine from an application programming interface (API);

mandating use of the new platform migration if an optional-use period has expired and a metric comprising a percentage of commands from clients which exclude the new platform migration from bundles of platform migrations falls short of a threshold;

receiving a command from a client, the command comprising a bundle identifier for the client and an identification of the routine;

determining a bundle of platform migrations associated with the client based on the bundle identifier, at least one platform migration of the bundle of platform migrations specifying a version of the routine; and executing the version of the routine in the new platform migration using a processor on behalf of the client if the new platform migration is mandated, or to execute the version of the routine specified in the requested bundle of platform migrations if the new platform migration is not mandated.

9. The method of claim 8, the client comprising a first version of a client application, the bundle identifier associated with the first version of the client application, wherein a second bundle identifier is associated with a second version of the client application, a second client comprising the second version of the client application, further comprising:

receiving a second command from the second client;

determining a second bundle of platform migrations based on the second bundle identifier, the second bundle of platform migrations distinct from the first bundle of platform migrations; and executing the second command based on the determined second bundle of platform migrations.

10. The method of claim 8, comprising:

receiving a new platform migration; and setting the new platform migration as inactive in the bundle of platform migrations identified by the bundle identifier.

11. The method of claim 8, comprising:

receiving a new platform migration;

determining that a metric representing the exclusion of the new platform migration from bundles of platform migrations by clients exceeds a threshold; and extending an optional-use period for the new platform migration.

12. At least one non-transitory computer-readable storage medium comprising instructions that, when executed, cause a system to:

add a new platform migration to a set of platform migrations available to a client, the new platform migration comprising a version of a routine from an application programming interface (API);

mandate use of the new platform migration if an optional-use period has expired and a metric comprising a percentage of commands from clients which exclude the new platform migration from bundles of platform migrations falls short of a threshold;

receive a command from a client, the command comprising a bundle identifier for the client and an identification of the routine, the bundle identifier identifying a bundle of platform migrations that define custom behaviors;

determine a bundle of platform migrations associated with the client based on the bundle identifier, at least one platform migration of the bundle of platform migrations specifying a version of the routine; and execute the version of the routine in the new platform migration using a processor on behalf of the client if the new platform migration is mandated, or to execute the version of the routine specified in the requested bundle of platform migrations if the new platform migration is not mandated.

13. The computer-readable storage medium of claim 12, the client comprising a first version of a client application, the bundle identifier associated with the first version of the client application, wherein a second bundle identifier is associated with a second version of the client application, a second client comprising the second version of the client application, comprising further instructions that, when executed, cause a system to:

receive a second command from the second client;

determine a second bundle of platform migrations based on the second bundle identifier, the second bundle of platform migrations distinct from the first bundle of platform migrations; and execute the second command based on the determined second bundle of platform migrations.

14. The computer-readable storage medium of claim 12 comprising further instructions that, when executed, cause a system to:

receive a new platform migration; and set the new platform migration as inactive in the bundle of platform migrations identified by the bundle identifier.

15. The computer-readable storage medium of claim 12 comprising further instructions that, when executed, cause a system to:

receive a new platform migration;

determine that a metric representing the exclusion of the new platform migration from bundles of platform migrations by clients exceeds a threshold; and extend an optional-use period for the new platform migration.

16. The computer-readable storage medium of claim 12, further storing instructions for providing an interface component, a bundle component and an execution component, wherein:

the command is received at the interface component, and the interface component is configured to:

parse the command to separate the routine from the bundle identifier, forward the bundle identifier to the bundle component, the bundle component configured to perform the determining of the bundle of platform migrations, and forward the command to the execution component, the execution component being configured to performing the executing of the specified version of the routine on behalf of the client.

* * * * *